(12) United States Patent
Sishtla et al.

(10) Patent No.: US 8,902,101 B1
(45) Date of Patent: Dec. 2, 2014

(54) SYSTEM FOR AND METHOD OF WIND SHEAR DETECTION

(75) Inventors: Venkata A. Sishtla, Marion, IA (US); Jeffery A. Finley, Cedar Rapids, IA (US); Mark B. Godfrey, Melbourne, FL (US); Yoel H. Sonera, Palm Bay, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 386 days.

(21) Appl. No.: 13/247,868

(22) Filed: Sep. 28, 2011

(51) Int. Cl.
 *G01S 13/95* (2006.01)
(52) U.S. Cl.
 CPC .................................. *G01S 13/953* (2013.01)
 USPC ..................................... 342/26 R; 342/26 B
(58) Field of Classification Search
 CPC ....... G01S 13/95; G01S 7/412; G01S 7/4052; G01S 13/9035; G01S 2007/4095; G01S 13/418; G09B 9/54; G08G 5/0091
 USPC ..................................... 342/26 R, 26 A–26 D
 See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,739,380 A | 6/1973 | Burdic et al. | |
| 3,815,132 A | 6/1974 | Case, Jr. et al. | |
| 4,665,401 A | 5/1987 | Garrard et al. | |
| 4,760,396 A | 7/1988 | Barney et al. | |
| 5,148,110 A * | 9/1992 | Helms | 324/323 |
| 5,317,315 A * | 5/1994 | Karhunen et al. | 342/26 B |
| 5,945,926 A | 8/1999 | Ammar et al. | |
| 6,208,285 B1 * | 3/2001 | Burkhardt | 342/132 |
| 7,002,511 B1 | 2/2006 | Ammar et al. | |
| 7,548,193 B2 * | 6/2009 | Wakayama et al. | 342/194 |
| 7,626,535 B2 * | 12/2009 | Ding et al. | 342/95 |
| 7,675,458 B2 * | 3/2010 | Hubbard et al. | 342/159 |
| 7,737,882 B2 * | 6/2010 | Matsuoka | 342/109 |
| 7,864,098 B2 * | 1/2011 | Kajio et al. | 342/59 |
| 8,031,105 B2 * | 10/2011 | Stayton | 342/36 |
| 8,159,369 B1 * | 4/2012 | Koenigs et al. | 340/963 |
| 8,188,908 B2 * | 5/2012 | Landt | 342/51 |
| 8,203,480 B1 * | 6/2012 | Woodell et al. | 342/26 B |
| 8,742,951 B1 * | 6/2014 | Sishtla et al. | 340/968 |
| 8,742,973 B1 * | 6/2014 | Fersdahl | 342/26 B |
| 8,742,974 B1 * | 6/2014 | Sishtla et al. | 342/26 B |
| 8,786,467 B2 * | 7/2014 | Clark et al. | 340/958 |
| 8,786,486 B1 * | 7/2014 | Sperling et al. | 342/26 B |

(Continued)

*Primary Examiner* — John B Sotomayor
(74) *Attorney, Agent, or Firm* — Angel N. Gerdzhikov; Donna P. Suchy; Daniel M. Barbieri

(57) ABSTRACT

A radar system includes an antenna. The radar system comprises a transmitter coupled to the antenna. The transmitter provides a radar signal. The radar signal includes a first set of pulses having a high bandwidth and a second set of pulses having a lower bandwidth. In one embodiment, the radar system is used for wind shear detection and the antenna is a smaller antenna.

20 Claims, 5 Drawing Sheets

(56) References Cited

U.S. PATENT DOCUMENTS

| | | |
|---|---|---|
| 2003/0156054 A1 | 8/2003 | Ishii et al. |
| 2003/0193430 A1 | 10/2003 | Gresham et al. |
| 2005/0104765 A1 | 5/2005 | Bandhauer |
| 2005/0140542 A1 | 6/2005 | Ikeda |
| 2005/0156778 A1 | 7/2005 | Yap |
| 2005/0190100 A1 | 9/2005 | Hester et al. |
| 2005/0253748 A1 | 11/2005 | Brookner |
| 2007/0229349 A1 * | 10/2007 | Kajio et al. .............. 342/82 |

* cited by examiner

SYSTEM FOR AND METHOD OF WIND SHEAR DETECTION

CROSS-REFERENCE TO RELATED PATENT APPLICATIONS

The present application is related to U.S. patent application Ser. No. 12/235,411, entitled "RADAR SYSTEM AND METHOD USING PULSE COMPRESSION", filed on Sep. 22, 2008, which is herein incorporated by reference in its entirety and is assigned to the assignee of the present application.

BACKGROUND

The present disclosure relates generally to the field of aircraft radar systems. More specifically, the application relates to wind shear detection using aircraft radar systems.

Wind shear detection (e.g., predictive wind shear detection) uses weather radar to determine a high gradient of wind velocities in a localized area. Conventional radar systems emit a generally uniform, rectangular pulse of energy which reflects off a weather target and is received by the radar system. Doppler signatures associated with the radar returns are processed to determine the presence of wind shear. For airborne weather radars, wind shear detection can be difficult when smaller antennas (e.g., diameter less than 24 inches) are used.

Signal-to-noise ratio (SNR) and signal-to-clutter ratio (SCR) decrease due to lower antenna gain and wider main lobe associated with antenna-size reductions. A wider main lobe results in more main lobe clutter. In addition, when smaller antennas are employed in smaller aircraft such as business and regional service aircraft, SNR decreases further due to lower lobe gains associated with lower power of the transmitter installed in those types of aircraft.

Therefore, there is a need for a radar system and method capable of identifying and rejecting ground clutter without adversely reducing signal-to-noise ratio associated with weather targets. There is also need is a radar system for and method of optimizing a transmitter signal for wind shear detection. Further, there is a need for radar system and method that uses a transmitter signal for wind shear detection optimized for use with smaller antennas.

SUMMARY

An exemplary embodiment relates to a radar system including an antenna. The radar system comprises a transmitter coupled to the antenna. The transmitter provides a radar signal. The radar signal includes a first set of pulses having a first bandwidth and a second set of pluses having a second bandwidth. The first bandwidth is higher than the second bandwidth In one embodiment, the radar system is used for wind shear detection and the antenna is a smaller antenna.

Another exemplary embodiment relates to an aircraft radar. The aircraft radar includes means for transmitting a hybrid pulse pattern signal. The aircraft radar also includes means for providing the hybrid pulse pattern signal to the means for transmitting. The hybrid pulse pattern signal includes modulated pulses followed by non-modulated pulses.

Yet another exemplary embodiment relates to a method of detecting a wind shear event using a radar system. The method includes providing a radar signal. The radar signal includes a first set of pulses having a high bandwidth and a second set of pulses having a lower bandwidth. The method also includes receiving a return associated with the radar signal and processing data from the return, the data being associated with the first set of pulses. The data is processed to determine ground clutter targets. The method also includes processing data from the return, the data being associated with the second set of pulses to determine the wind shear event.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
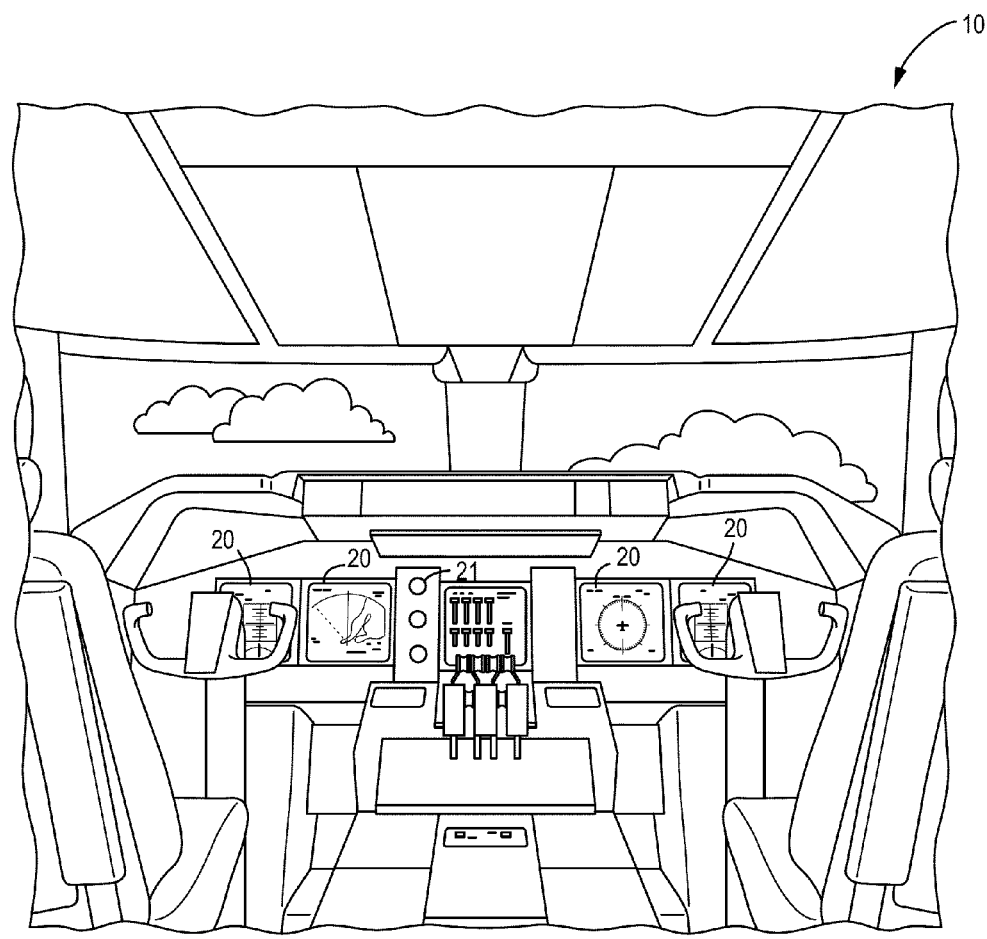
FIG. 1 is a schematic illustration of an aircraft control center or cockpit for an aircraft according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 10 is shown, according to one exemplary embodiment. Aircraft control center 10 includes flight displays 20. Flight displays 20 can be used to provide information to the flight crew, thereby increasing visual range and enhancing decision-making abilities.

In an exemplary embodiment, flight displays 20 can provide an output from a radar system of the aircraft. Flight displays 20 can include a weather display, a joint display, a weather radar map and a terrain display. Further, flight displays 20 may include an electronic display or a synthetic vision system (SVS). For example, flight displays 20 can include a display configured to display a three dimensional perspective image of terrain and/or weather information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Aircraft control center 10 additionally includes one or more user interface (UI) elements 21. UI elements 21 can include dials, switches, buttons, touch screens, or any other user input device. UI elements 21 can be used to adjust features of flight displays 20, such as contrast, brightness, width, and length. UI elements 21 can also (or alternatively) be used by an occupant to interface with or change the displays of flight displays 20. UI elements 21 can additionally be used to acknowledge or dismiss an indicator provided by flight displays 20. Further, UI elements 21 can be used to correct errors on the electronic display.

Figure 2:
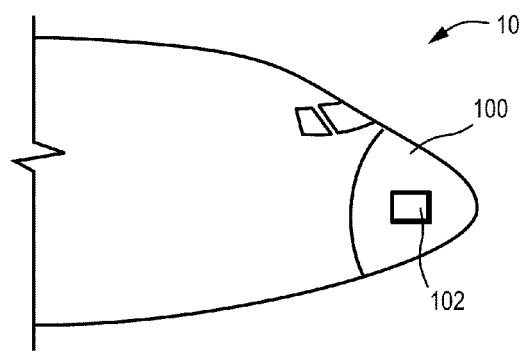
FIG. 2 a side view schematic drawing of a front portion of the aircraft including a radar system according to an exemplary embodiment.

Referring to FIG. 2, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 can be located on the top of the aircraft or on the tail of the aircraft. Yet further, radar system 102 can be located anywhere on the aircraft. Furthermore, the various components of radar system 102 can be distributed at multiple locations throughout the aircraft. Additionally, radar system 102 can include or be coupled to an antenna system of the aircraft.

Figure 3:
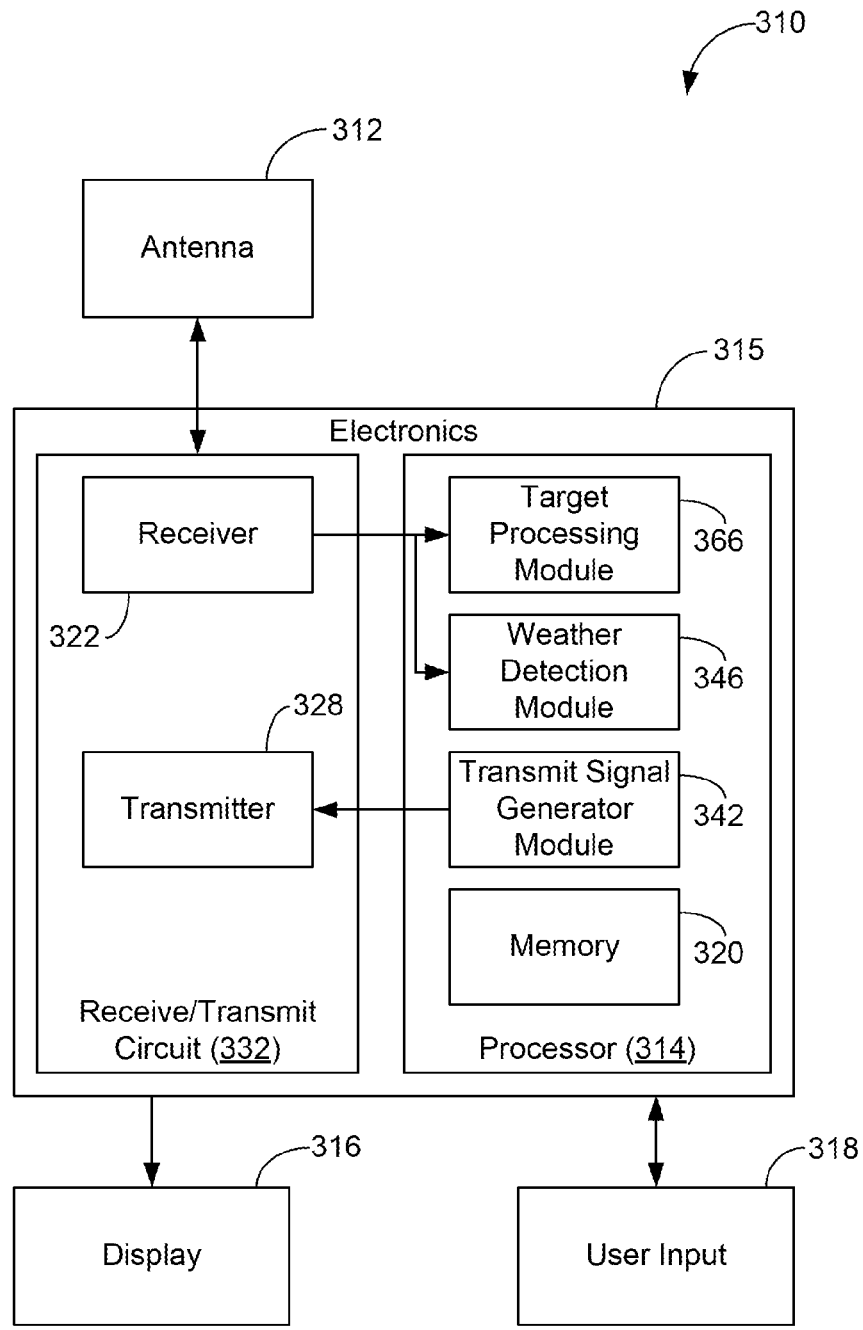
FIG. 3 is a general block diagram of the aircraft radar system illustrated in FIG. 2 according to an exemplary embodiment.

Referring to FIG. 3, a hazard warning system or radar system 310 is configured to provide a combination of high and low bandwidth pulses for transmission. In one embodiment, radar system 310 is a weather radar system and provides a hybrid pulse pattern 510 (FIG. 5) which is optimized for wind shear detection and/or other weather detection. Radar system 310 can be a Multiscan™ radar system manufactured by Rockwell Collins or an RDR 4000 radar system manufactured by Honeywell Aerospace configured as described herein.

Hybrid pulse pattern 510 can include a train of pulses in one embodiment. The first set of pulses in the train can have a high bandwidth while a second set of pulses in the train pulses can have a low bandwidth in one embodiment. The high bandwidth can be achieved using pulse compression or modulation in one embodiment. The modulation can be phase modulation, frequency modulation or other type of modulation/coding. The high bandwidth can be between 2 and 10 Hz according to one example. The low bandwidth can be between 200 and 800 KHz according to another example. The second set of pulses can be unmodulated in one embodiment.

The first set of pulses can be used to identify ground targets while the second set of pulses can be used to enhance weather detections, such as, wind shear detection in one embodiment. In a preferred embodiment, returns associated with the ground targets identified by the first set of pulses are rejected from the analysis of weather.

Aircraft radar system 310 preferably includes radar antenna 312, electronics 315, a display 316, a user input 318, and a memory 320. Electronics 315 includes processor 314 and a receive/transmit circuit 332. Receive/transmit circuit 332 includes a receiver 322 and a transmitter 328.

Antenna 312 is preferably a small, dish-shaped antenna associated with smaller aircraft, such as business and regional service jets. In one embodiment, antenna 312 can have a radius between 18 inches and 24 inches, less than 24 inches, etc. Alternatively, other sizes and shapes of antenna can be used.

Processor 314 preferably includes a target processing module 326, a weather detection module 346 (e.g., a wind sheer detection module), and transmit signal generator module 342. Target processing module 326, a wind shear detection module 346, and transmit signal generator module 342 are preferably software executed on a computing platform (e.g., processor 314) associated with radar system 310. Modules 326, 342, and 346 can be stored on a non-transitory medium and can include hardware components or software/hardware components.

Transmit signal generator module 342 preferably operates in conjunction with transmitter 328 so that hybrid pulse pattern 510 is provided by antenna 312. Transmit signal generator module 342 coordinates the timing of the first set of pulses and the second set of pulses of pattern 510 including the associated modulation of the first set of pulses.

Receiver 322 is coupled to antenna 312 and is configured to receive radar returns (e.g., weather radar returns) from antenna 312. Receiver 322 provides the radar returns or data associated with the radar returns to processor 314. Processor 314 is generally configured to process data associated with returns received by antenna 312 to determine a hazard threat level and provide hazard indication on display 316. The hazard indication can be a caution, a warning, an alert, etc. In addition, processor 314 can provide indications of weather on display 316. Alternatively or in addition, system 310 can be used for targeting and guidance, terrain avoidance, etc.

Target processing module 326 identifies ground targets using data from returns associated with the first set of pulses. The first set of pulses have a higher resolution with respect to ground targets in one embodiment. Accordingly, module 326 is able to more accurately identify and locate the ground targets using the data associated with the first set of pulses. Target processing 326 can utilize the power versus range relationship to identify ground targets for a scan or epoch.

Weather detection module 346 uses returns associated with the second set of pulses to sense and locate weather and weather hazards. Weather detection module advantageously rejects data associated with the ground targets identified by target processing module 326. Returns having the location of known targets as detected by module 326 can be eliminated form the data or be processed with a consideration that the return is from a ground target.

Processor 314 can process data to provide hazard detection indications on display 316, for example, precipitation, lightning, hail, turbulence, terrain, ground structures, etc. In addition, processor 314 can cause system 310 to perform further analysis in light of information from user input 318 or memory 320. The further analysis can even include causing system 310 to perform radar queuing and control in azimuth and elevation as well as examining new data or historical data.

Figure 5:
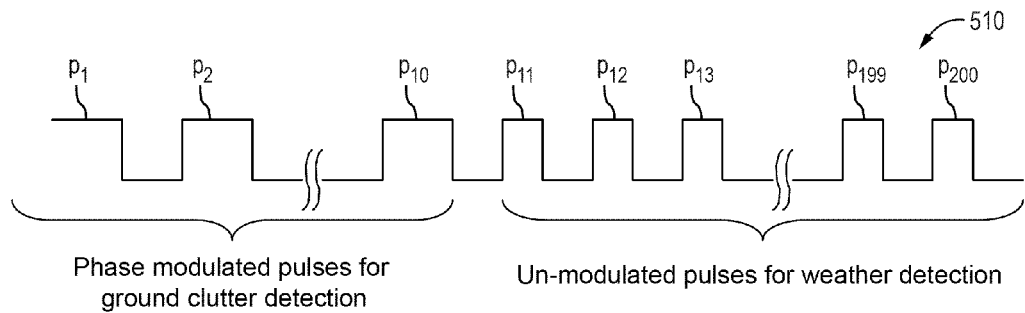
FIG. 5 is a waveform diagram of a transmitted signal for the radar system illustrated in FIG. 3 according to an exemplary embodiment.

With reference to FIG. 5, hybrid pulse pattern 510 includes first set of ten pulses $p_1$-$p_{10}$ and second set of one hundred ninety pulses $p_{11}$-$p_{200}$. In one embodiment, hybrid pulse pattern 510 is provided in one scan or epoch. Preferably, the epoch is performed at a specific tilt angle in one embodiment.

Pulses $p_1$-$p_{10}$ are preferably phase modulated signals and pulses $p_{11}$-$p_{200}$ are preferably non-modulated signals. In other exemplary embodiments, the pulse compression of pulses $p_1$-$p_{10}$ may be otherwise accomplished, such as by frequency modulation. As discussed above, returns from pulses $p_1$-$p_{10}$ can be used for ground target identification (e.g., terrain target, obstacle, etc.) and location by target processing module 326 and returns from pulses $p_{11}$-$p_{200}$ are used for weather detection by weather detection module 346.

Alternatively, other ratios of sets of pulses $p_1$-$p_{10}$:$p_{11}$-$p_{200}$ can be utilized. For example, the first set of pulses can include only five pulses and the second set of pulses can include 195 pulses in one embodiment. Further, the first set of pulses can include four pulses and the second set of pulses can include 196 pulses. Further, the total number of pulses does not need to be 200 pulses. Various numbers of pulses from the first set to the second set and total number of pulses can be utilized without departing from the scope of the invention. Applicants have found in one embodiment that the first set of pulses is preferably greater than four pulses.

Pulses $p_1$-$p_{10}$ are preferably a first set of pulses and can be 3.49 microsecond wide pulses in one exemplary embodiment. Pulses $p_1$-$p_{10}$ can be modulated using a Barker code of 13:1. Pulses $p_{11}$-$p_{200}$ are preferably a second set of pulses and can be 2.11 microsecond wide pulses in one exemplary embodiment. In one embodiment, hybrid pulse pattern 510 includes a total of 200 pulses. Shorter pulses generally have less energy and less signal to noise ratio, while longer pulses have less range. The pulse sizes and number of pulses described above are exemplary only and do not limit the scope of any claim unless explicitly recited in that claim.

Pulses $p_1$-$p_{200}$ are transmitted at a 6,000 Hz pulse repetition frequency (PRF) in one exemplary embodiment. Pulse pattern 510 advantageously allows processor 315 to identify and eliminate strong clutter targets while maintaining good signal-to-noise ratios for weather detection. Weather detection module 346 preferably is capable of predictive wind shear detection or forward looking wind shear detection and is capable of detecting 0 decibel Dbz weather targets (SNR<1 DB) in the presence of strong industrial clutter (SCR<−68 Db). Pulses $p_1$-$p_{10}$ have a lower gain and a narrower effective pulse width which results in higher resolution in one embodiment. Pulses $p_{11}$-$p_{200}$ have a narrower bandwidth and, therefore, a better SNR in one embodiment.

Figure 4:
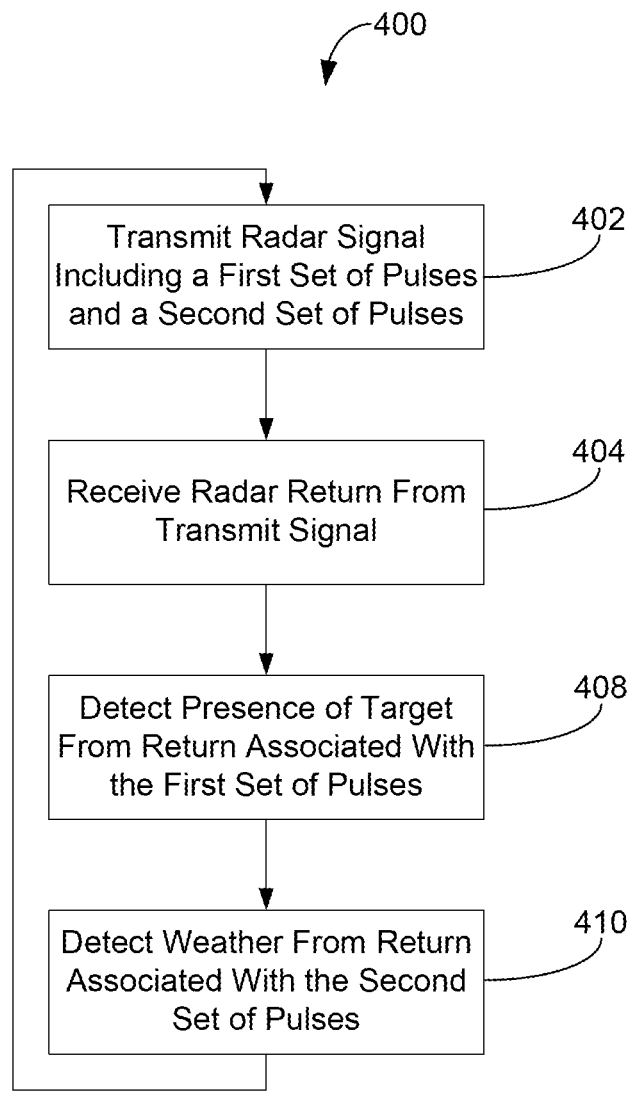
FIG. 4 is a process flow diagram of a method for detecting weather using the radar system of FIG. 3 according to an exemplary embodiment.

With reference to FIG. 4, a method 400 can be executed by system 310 to provide hybrid pulse pattern 510 and detect weather phenomenon from returns from the hybrid pulse pattern 510. At a step 402, processor 314 using transmit signal generator module 342 causes system 310 to provide hybrid pulse pattern 510.

At a step 404, radar returns from the hybrid pulse pattern 510 are received by receiver 322. At a step 408, processor 314 via target processing module 326 detects the presence of terrain targets or objects from returns associated with first pulses $p_1$-$p_{10}$ of pattern 510 in one embodiment. Module 326 can also locate the target. When a target is identified as a ground target, target processing module 326 can reduce the amount of power associated with returns from that target in one embodiment.

At a step 410, weather phenomenon is detected by processor 314 via weather detection module 346 from returns associated with pulses $p_{11}$-$p_{200}$ of pattern 510 in one embodiment. Module 346 is preferably a wind shear detection module operating at lower altitudes (during approach or landing).

Figure 6:
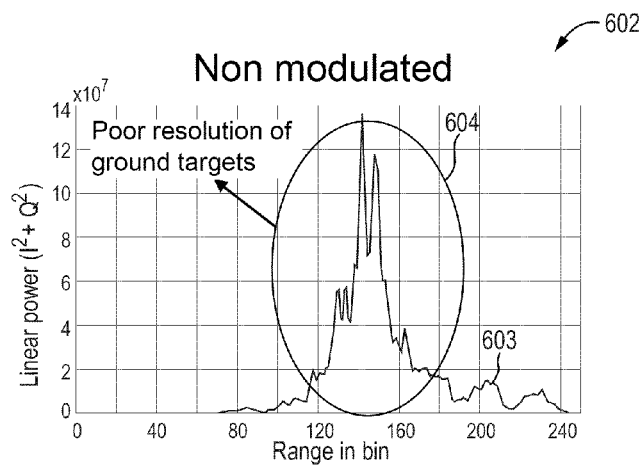
FIG. 6 is a chart illustrating the relationship of power and range of a return signal from a non-modulated transmission signal directed at ground targets.

With reference to FIG. 6, a chart 602 includes a return 603 from a non-modulated transmission signal striking a ground targets. The non-modulated transmission signal can be similar to pulses $p_{11}$-$p_{200}$ of pattern 510 provided by radar system 310. In FIG. 6, the Y axis represents power and the X axis represents range.

A portion 604 of return 603 shows poor resolution of ground targets from the return using the non-modulated transmission signal. As shown in portion 604, the range to particular ground clutter targets is difficult to ascertain given the resolution.

Figure 7:
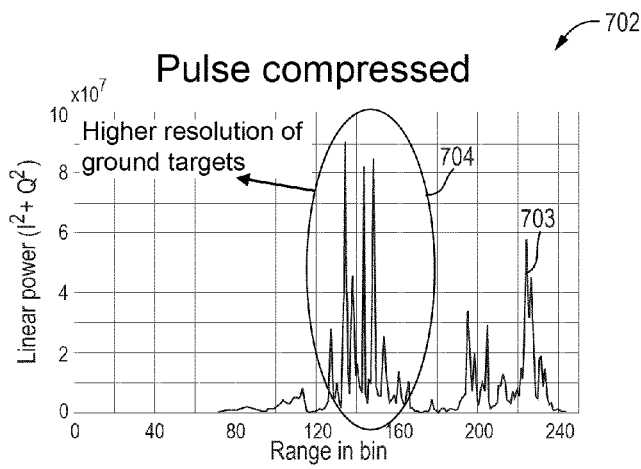
FIG. 7 is a chart illustrating the relationship of power and range of a return signal from a modulated transmission signal directed at ground targets.

With reference to FIG. 7, a chart 702 includes a return 703 from a modulated transmission signal striking a ground targets. The modulated transmission signal can be similar to pulses $p_1$-$p_{10}$ of pattern 510 provided by radar system 310. In FIG. 7, the Y axis represents power, and the X axis represents range.

A portion 704 of return 703 shows higher resolution of ground targets from the return using the modulated transmission signal. As shown in portion 704, the range to particular ground clutter targets is difficult to ascertain given the resolution. Accordingly, ground clutter targets are more distinguishable using pulses $p_1$-$p_{10}$ of pattern 510.

Figure 8:
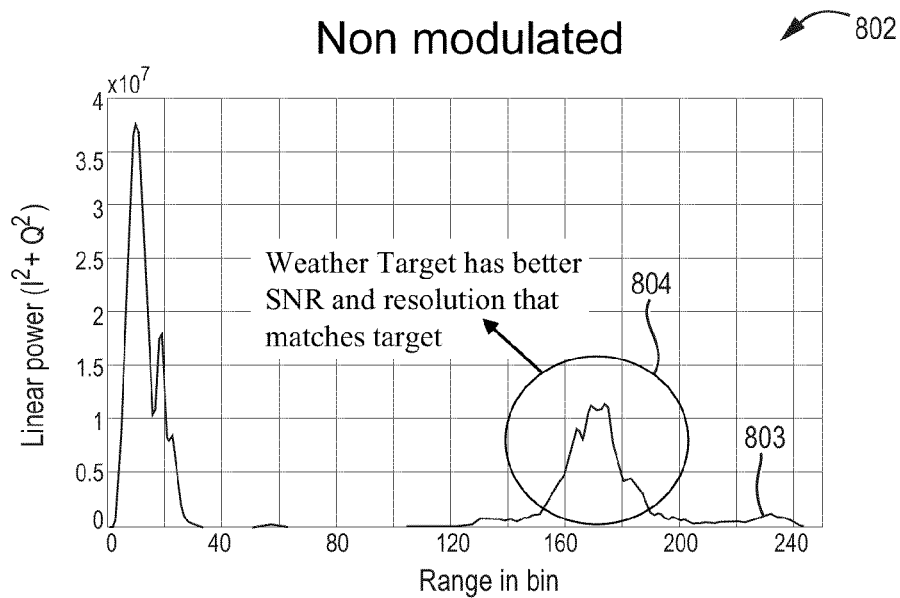
FIG. 8 is a chart illustrating the relationship of power and range of a return signal from a non-modulated transmission signal directed at weather targets.

With reference to FIG. 8, a chart 802 includes a return 803 from a non-modulated transmission signal directed at weather targets. The non-modulated transmission signal can be similar to pulses $p_{11}$-$p_{200}$ of pattern 510 provided by radar system 310. In FIG. 8, the Y axis represents power, and the X axis represents range. A portion 804 of return 803 shows better SNR and better resolution for weather targets.

Figure 9:
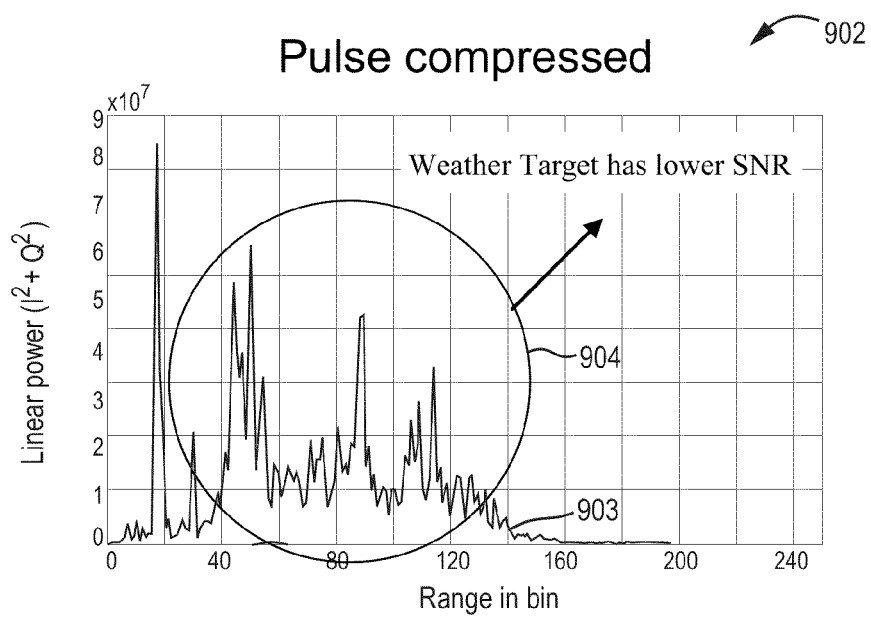
FIG. 9 is a chart illustrating the relationship of power and range of a return signal from a modulated transmission signal directed at weather targets.

With reference to FIG. 9, a chart 902 includes a return 903 from a modulated transmission signal directed at weather targets. The modulated transmission signal can be similar to pulses $p_1$-$p_{10}$ of pattern 510 provided by radar system 310. In FIG. 9, the Y axis represents power, and the X axis represents range. A portion 904 of return 903 shows lower SNR for weather targets using the modulated transmission signal.

According to various exemplary embodiments, processor 314 can be any hardware and/or software processor or processing architecture capable of executing instructions and operating on data related to hazard detection. According to one exemplary embodiment, memory 320 may be an inertial memory or inertial memory system. The inertial memory or inertial memory system may be any memory or memory system in which data storage and extraction compensates for the translational and/or rotational movement of the aircraft. According to various exemplary embodiments, memory 320 can be any volatile or non-volatile memory capable of storing data and/or instructions related to aircraft radar system 310.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A radar system including an antenna, the radar system comprising:
   a processor; and
   a transmitter coupled to the antenna and providing a radar signal in response to the processor, wherein the radar signal includes a first set of pulses having a first bandwidth and a second set of pulses having a second bandwidth, the first bandwidth being higher than the second bandwidth.

2. The radar system of claim 1, further comprising:
a receiver coupled to the antenna and receiving first returns associated with the first set of pulses wherein the processor uses the first returns to identify ground targets and the receiver receives second returns associated with the second set of pulses and the processor uses the second returns to identify weather.

3. A radar system including an antenna, the radar system comprising:
a transmitter coupled to the antenna and providing a radar signal, wherein the radar signal includes a first set of pulses having a first bandwidth and a second set of pulses having a second bandwidth, the first bandwidth being higher than the second bandwidth, wherein the first set of pulses is used to identify ground targets and the second set of pulses is used to identify weather;
a receiver coupled to the antenna and receiving radar returns associated with the radar signal; and
a processor coupled to the receiver and processing the radar returns to perform wind shear detection.

4. The radar system of claim 2, wherein the processor determines a presence of a ground target at close range in response to the first returns.

5. The radar system of claim 1, wherein the first set of pulses is comprised of pulse compression pulses and the second set of pulses is comprised of non-modulated pulses, wherein the processor coordinates the timing to provide the pulse compression pulses and the non-modulated pulses.

6. The radar system of claim 5, wherein the first set of pulses is 5 percent or less of the radar signal.

7. The radar system of claim 1 wherein the processor coordinates the timing of the first set of pulses and the second set of pulses so that radar signal is comprised of 10 pulses of the first set of pulses and 190 pulses of the second set of pulses, the first set of pulses and the second set of pulses being transmitted at a 6000 Hz pulse repetition frequency.

8. The radar system of claim 2 wherein the second returns have a high signal-to-noise ratio for weather targets due to a longer pulse length associated with the second set of pulses as coordinated by the processor.

9. The radar system of claim 1 wherein the processor provides phase modulation for the first set of pulses.

10. An aircraft radar, comprising:
means for transmitting a hybrid pulse pattern signal; and
means for providing the hybrid pulse pattern signal to the means for transmitting the hybrid pulse pattern signal, the hybrid pulse pattern signal including modulated pulses followed by non-modulated pulses, the means for providing including a processor and a transmitter, the processor coordinating the provision of the hybrid pulse pattern by the transmitter, wherein the hybrid pulse pattern signal includes a first set of pulses having a first bandwidth and a second set of pulses having a second bandwidth, the first bandwidth being higher than the second bandwidth.

11. The aircraft radar of claim 10, wherein the means for transmitting is an antenna having a diameter of less than 24 inches.

12. The aircraft radar of claim 10, wherein the processor provides a Barker code in the modulated pulses.

13. The aircraft radar of claim 12, wherein the processor modulates using the Barker code of 13:1.

14. The aircraft radar of claim 10, wherein the processor provides modulated pulses making up 10 percent or less of the hybrid pulse pattern.

15. The aircraft radar of claim 10, wherein the processor provides high bandwidth modulated pulses and low bandwidth non-modulated pulses.

16. A method of detecting a wind shear event using a radar system, the method comprising:
providing a radar signal, wherein the radar signal includes a first set of pulses having a high bandwidth and a second set of pulses have a lower bandwidth;
receiving a return associated the radar signal;
processing first data from the return to determine ground clutter targets, the first data being associated with the first set of pulses; and
processing second data from the return to determine the wind shear event, the second data being associated with the second set of pulses.

17. The method of claim 16, wherein the first set of pulses is phase modulated.

18. The method of claim 16, wherein the second set of pulses has a narrow bandwidth.

19. The method of claim 16, wherein the radar signal is a hybrid signal of 200 pulses at a pulse repetition frequency of 6000 Hz.

20. The method of claim 16, wherein the return is received on an antenna having a diameter of less than 24 inches.

* * * * *